Aug. 23, 1927.
J. A. SPENCER
1,639,708
THERMOSTAT
Original Filed April 8, 1921
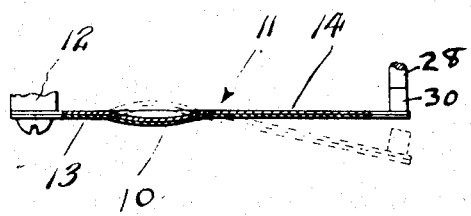

Patented Aug. 23, 1927.

1,639,708

UNITED STATES PATENT OFFICE.

JOHN A. SPENCER, OF REVERE, MASSACHUSETTS, ASSIGNOR TO SPENCER THERMO-STAT COMPANY, OF CAMBRIDGE, MASSACHUSETTS, A CORPORATION OF MASSACHUSETTS.

THERMOSTAT.

Original application filed April 8, 1921, Serial No. 459,773. Divided and this application filed March 12, 1923. Serial No. 624,598.

The present invention relates to temperature controlled apparatus and more particularly to devices of this character adapted to operate valves, switches and other members when certain temperature limits are reached. This application is a division of my application Serial No. 459,773 filed April 8, 1921, patented March 13, 1923, Patent No. 1,448,240.

Thermostatic controls for heating and other apparatus consisting of two dissimilar metals having different coefficients of thermal expansion have long been used. These controls have certain very decided objections, however, primarily due to the fact that the change of state takes place slowly in accordance with the change in temperature.

The object of the present invention is to provide an improved type of thermostatic control applicable to a variety of purposes and which overcomes the objections inherent in existing controls of this character.

With this object in view one feature of the invention contemplates the provision of a thermostatic device to which is imparted a sudden and rapid movement when a substantially predetermined temperature is reached.

In the simplest and most efficient form of the invention which has yet been devised a relatively thin sheet consisting of two metals having different thermal coefficients of expansion is formed into a non-developable sheet. When this device is heated to a certain point the sheet is suddenly caused to curve in a direction opposite to that in which it is initially curved, remaining in this condition until the temperature is substantially lowered. Upon reaching a predetermined lower limit of temperature, the sheet is suddenly curved in the opposite direction. The action of this device may be compared to the principle of a toggle lever having a spring which normally holds it in an inclined or broken position. In the present case the unequal expansion or contraction of the metals forming the disk provides force for reversing the curvature of the non-developable sheet.

In the accompanying drawings illustrating the preferred form of the invention the figure represents the invention used for making and breaking a circuit.

The illustrated embodiment of the invention is shown particularly in connection with an electric switch, in which connection the present invention has particular utility, owing to the quick breaking of the circuit which results from the sudden reversal of shape of the thermostatic sheet. The thermostatic control is indicated as a composite sheet made up of two materials, in this instance two metals such as iron and brass, having different thermal coefficients of expansion so that a change in temperature will cause unequal expansion and contraction of opposite faces of the sheet. This sheet is shaped into a cupped portion or nondevelopable surface, as, for example, by forming a spherical projection 10 in a flat sheet 11. If a thermostatic sheet is thus shaped and constructed it will be found that upon raising the temperature the unequal expansion of the materials forming the sheet will cause a tendency to flatten the cupped surface until at a predetermined temperature a sudden curving of the nondevelopable surface into the opposite direction occurs, which reversal of shape or flexure will be maintained until the temperature has been substantially lowered. Thereafter upon reaching a substantially predetermined temperature the sheet will suddenly return to its initial shape. In both of these movements the reversal of curvature is exceedingly abrupt and is caused by the expansion and contraction of the materials of which the thermostatic sheet is composed. Free expansion and contraction of the inner portion of the dent or curve of the sheet is opposed or prevented by the material surrounding said portion. Upon rise of temperature the expansion of the materials of the inner portion causes stresses to be set up in the materials. When these stresses are sufficient to cause the device to reach a condition of instability (this condition is reached at a predetermined temperature) the ensuing sudden liberation of the stored stresses effects a sudden movement of said portion, the movement occurring automatically.

The uses to which a thermostatic control may be put are manifold, especially in connection with the control of electric circuits, as the action of the non-developable sheet is sudden and positive and the reversal of shape occurs with considerable force, depending upon the thickness of the sheet and the area of the surface which undergoes the change. With such a construction the circuit is automatically cut off when an excessive temperature limit is reached, the curved sheet at this point suddenly breaking the circuit through the two contacts 28 and 30. Because of the short length of the arm or portion 13 between support 12 and non-developable portion 10, as compared with the length of arm 14 (between portion 10 and the other end of the sheet) the displacement of said other end of the sheet effected by reversal of portion 10, is of greater magnitude, and produces a comparatively wide gap at contacts 28, 30. The movement of that end of the sheet, and therefore of contact 30, is thus sudden, forceful, and of a magnitude sufficient for breaking many kinds of circuits that could not be safely broken by prior thermostats without the aid of auxiliary devices. When the temperature of the thermostatic sheet has been reduced (that is, changed in opposite sense or direction) to a predetermined point it will return to its initial position and close the circuit.

It should be understood that the present invention is not limited to any particular combination of materials having different thermal coefficients of expansion but is intended to embrace in its scope any combination of materials having dissimilar thermal coefficients of expansion sufficient to cause the characteristic reversal of curvature. Furthermore, the two materials comprising the composite thermostatic sheet may be secured together in any desired manner by riveting, soldering, brazing or otherwise although it is preferred to unite the materials comprising the sheet by welding or similar means to secure a substantially indivisible sheet.

From the foregoing it will be evident that in one aspect the invention involves a thermostatic device characterized by portions the central and marginal portions of the cupped part 10 arranged to react upon each other with change of temperature to set up stresses the magnitude of which changes upon change of temperature, at least one of the portions being formed of different metals or other components having different coefficients of expansion, the device reaching a condition of instability at a predetermined temperature by virtue of the arrangement of said portions and as a result of the differential expansion of the components due to change of temperature, whereupon said stresses become effective to change abruptly the relative position of said portions.

Having described the invention, what is claimed is:

1. A thermostat comprising a sheet of composite thermostatic material, means for confining a portion of said material against free change of shape, thereby setting up internal stresses the magnitude of which changes upon change of temperature, the thermostat reaching a condition of instability when it is cooled to a predetermined temperature, the material then abruptly changing its shape due to release of internal stresses theretofore stored up in the material, said portion being spaced from at least one end of said sheet, and means for supporting the sheet at one side of said portion.

2. A thermostat comprising composite thermostatic material, a portion of which is confined against free change of shape, thereby setting up internal stresses the magnitude of which changes upon change of temperature, the material being so shaped that change of its shape is a discontinuous function of the temperature, and means for supporting the sheet at one side of said portion, said portion being intermediate and spaced from the ends of said material.

3. A thermostat comprising a composite thermostatic sheet having a non-developable depression adapted to change its shape suddenly on reaching a predetermined temperature, and means for supporting the sheet at one side of said depression, said depression being located nearer to the support than to the other end of the sheet.

4. A thermostat comprising a composite thermostatic sheet having at least a part of its surface in the form of a dent of such a depth and shape that upon reaching a predetermined temperature the dent reaches a condition of instability and thereupon suddenly alters its shape due to release of internal stresses caused by change of temperature, and means for supporting the sheet at one side of said part, said part being located nearer to the support than to the other end of the sheet.

5. A thermostat having a composite thermostatic sheet portion and a second portion which is stressed by the expansion or contraction of the first portion with change of temperature and which opposes said expansion or contraction, the first portion when it attains a predetermined temperature tending to pass abruptly and automatically to another shape, and means for supporting the sheet at one side of said portions, said portions being located nearer to the support than to the other end of the sheet.

In testimony whereof, I have signed my name to this specification this 10th day of March, 1923.

JOHN A. SPENCER.